US 6,659,329 B1

(12) United States Patent
Hall (10) Patent No.: US 6,659,329 B1
(45) Date of Patent: Dec. 9, 2003

(54) SOLDERING ALLOY (75) Inventor: Peter Hall, Upper Arlington, OH (US)

(73) Assignee: Edison Welding Institute, Inc, Columbus, OH (US)

( * ) Notice: Subject to any disclaimer, the term of this patent is extended or adjusted under 35 U.S.C. 154(b) by 0 days.

(21) Appl. No.: 09/958,623

(22) PCT Filed: Apr. 14, 2000

(86) PCT No.: PCT/US00/10223

§ 371 (c)(1),
(2), (4) Date: Oct. 10, 2001

(87) PCT Pub. No.: WO00/62969

PCT Pub. Date: Oct. 26, 2000

Related U.S. Application Data (60) Provisional application No. 60/129,622, filed on Apr. 16, 1999.

(51) Int. Cl.[7] .............................. B23K 1/06; B23K 5/20; B23K 31/02; B23K 20/10
(52) U.S. Cl. ..................... 228/111.5; 228/111; 228/121; 228/122.1; 228/123.1; 228/124.5; 148/23; 148/24; 148/25; 148/26; 420/557; 420/580
(58) Field of Search .............................. 228/111.5, 207, 228/262.1–262.9, 248.1, 111, 121, 122.1, 123.1, 124.5; 420/557, 580, 589; 148/23–26

(56) References Cited

U.S. PATENT DOCUMENTS

| 1,591,983 | A | | 7/1926 | Koehnline | |
|---|---|---|---|---|---|
| 2,735,163 | A | | 2/1956 | Brooks et al. | |
| 3,340,028 | A | | 9/1967 | Vordahl | |
| 3,364,064 | A | | 1/1968 | Wijburg | |
| 3,663,184 | A | | 5/1972 | Wood | |
| 3,733,687 | A | * | 5/1973 | Tanaka et al. | 228/125 |
| 3,744,121 | A | * | 7/1973 | Nagano et al. | 228/123.1 |
| 3,833,986 | A | * | 9/1974 | DeCicco | 228/173.4 |
| 3,855,679 | A | * | 12/1974 | Schmatz | 228/209 |
| 3,949,118 | A | | 4/1976 | Nagano et al. | |
| 3,969,544 | A | * | 7/1976 | Obeda | 228/173.4 |
| 4,042,725 | A | | 8/1977 | Nomaki et al. | |
| 4,076,167 | A | * | 2/1978 | Wright | 228/173.4 |

(List continued on next page.)

FOREIGN PATENT DOCUMENTS

| JP | 04-162982 A | * | 6/1992 |
|---|---|---|---|
| JP | 07-96389 A | * | 4/1995 |

OTHER PUBLICATIONS

Hall, Peter C., Methods of Promoting Solder Wetting on Nitinol, SMST–97 Proceedings of the Second International Conference on Shape Memory and Superelastic technologies, Mar. 2–6, 1997.

Hall, Peter, Methods of Promoting Solder Wetting on Nitinol, ICAWT '98 Proceedings, Joining Applications in electronics and Medical Devices, Sep. 30–Oct. 2, 1998; pp. 219–225.

Asahi Glass Co., Ltd., Cerasolzer New Metal Solder for Glass and Ceramics, Apr. 15, 1991.

Primary Examiner—M. Alexandra Elve
Assistant Examiner—L. Edmondson
(74) Attorney, Agent, or Firm—Gallagher and Dawsey Co LPA; David J. Dawsey; Michael J. Gallagher (57) ABSTRACT A new soldering technique and solder alloy for wetting and joining hard-to-wet materials including titanium alloys such as nitinol uses a solder alloy containing tin and an active wetting promoting element such as aluminum in the presence of ultrasound. As shown in the Figure, molten solder alloy (10) is applied to the hard-to-wet material (18) with the application of ultrasonic energy (14) which removes coatings (20) such as tenacious surface oxides to leave the base material (18) which is readily wetted by the solder alloy (20).

23 Claims, 3 Drawing Sheets

U.S. PATENT DOCUMENTS

| | | | |
|---|---|---|---|
| 4,106,930 A | | 8/1978 | Nomaki et al. |
| 4,112,868 A | * | 9/1978 | Nomaki et al. ............. 228/125 |
| 4,121,750 A | * | 10/1978 | Schoer et al. ............... 228/219 |
| 4,130,232 A | | 12/1978 | Anderson |
| 4,186,474 A | * | 2/1980 | Hine .......................... 165/144 |
| 4,326,662 A | * | 4/1982 | Anderson ................... 228/111 |
| 4,352,450 A | | 10/1982 | Edgington |
| 4,451,541 A | | 5/1984 | Beal |
| 4,588,657 A | * | 5/1986 | Kujas ........................ 219/85.2 |
| 4,707,148 A | * | 11/1987 | Richmond ................. 165/144 |
| 4,797,328 A | | 1/1989 | Boehm |
| 4,954,184 A | | 9/1990 | Conn |
| 5,127,969 A | * | 7/1992 | Sekhar ........................ 148/23 |
| 5,147,471 A | | 9/1992 | Kronberg |
| 5,242,759 A | | 9/1993 | Hall |
| 5,354,623 A | * | 10/1994 | Hall ........................... 228/207 |
| 5,390,080 A | | 2/1995 | Melton et al. |
| 5,455,004 A | | 10/1995 | Slattery et al. |
| 5,492,772 A | | 2/1996 | Carey, II et al. |
| 5,664,723 A | * | 9/1997 | Sastri ......................... 228/209 |
| 5,851,482 A | * | 12/1998 | Kim ........................... 420/557 |
| 6,047,876 A | * | 4/2000 | Smith ...................... 228/111.5 |
| 6,319,461 B1 | * | 11/2001 | Domi et al. ................ 148/400 |
| 6,342,680 B1 | * | 1/2002 | Nakagawa et al. ........ 219/85.2 |
| 2002/0121541 A1 | * | 9/2002 | Lugscheider et al. .... 228/248.1 |

\* cited by examiner

SOLDERING ALLOY

CROSS REFERENCE TO RELATED APPLICATION

This application is the United States national stage of PCT Application PCT/US00/10223 filed on Apr. 14, 2000 (published as WO 00/62969 on Oct. 26, 2000) which claims the benefit of U.S. Provisional Application 60/129,622 filed on Apr. 16,1999 all of which is incorporated by reference as if completely written herein.

BACKGROUND OF THE INVENTION

1. Field

This invention relates to a soldering alloy made of tin and an active wetting promoting element such as aluminum and to a soldering technique that is useful for joining a wide variety of hard-to-wet and hard-to-join materials including titanium alloys (e.g., Nitinol), stainless steels, aluminum alloys, carbon steels, glasses, and ceramics.

2. Background

Nitinol is a trade name for a titanium alloy with a composition of nickel 50 atomic % titanium. Also known as "Tee-nee", "Memorite", "Tinel" or "Flexon", this alloy is utilized for its superelasticity, or shape memory effect. Shape memory is the ability to fully recover plastic deformation, up to 8%, upon heating above a specific temperature. Superelasticity is the ability to completely recover large "pseudo-elastic" strains on the order of 5 to 8% upon removal of the loading stress. This superelasticity and/or shape memory, coupled with Nitinol's biocompatibility, corrosion resistance, and fatigue resistance, make the alloy a very attractive material for a variety of applications. Although Nitnol can be joined using brazing or welding techniques, it begins to dramatically lose its superelasticity, and/or shape memory characteristics, when heated above approximately 500° C., as occurs during welding and brazing. Subsequent heat treatment can only recover a small percentage of the properties.

Although some efforts have been made to use soldering techniques, which by definition use temperatures below about 450° C., such efforts have been less than successful. Titanium and titanium alloys are difficult to solder because they form a particularly tenacious surface oxide that is hard to wet. While this oxide imparts these alloys with exceptional corrosion resistance, it also makes them extremely difficult to solder. Although two methods for soldering Nitinol have been used previously: 1) soldering using halogen-based fluxes, and 2) electro/electroless plating, both have significant draw backs.

A number of manufacturers have developed fluxes for use on aluminum alloys, which develop a tenacious surface oxide similar to that of titanium and its alloys. Although these fluxes have been found to be useful with Nitinol, they are typically based on very aggressive halogen bearing inorganic acids that are hazardous to handle and dispose of. During the soldering operation the flux generates large amounts of toxic fume that must be vented to prevent exposure to personnel. The flux residue remaining on the solder joint must also be cleaned off with hot water and mechanical scrubbing. The cleaning water and residue is an environmental hazard and must be handled and disposed of accordingly.

In addition, the flux residues must be cleaned off completely to prevent subsequent corrosion of the solder joint, and potential in-service contamination. Leaching of toxic flux materials from the joint presents a formidable problem in the manufacture of medical devices. The complex joint geometry often necessary in surgical devices makes complete removal of flux residue difficult, time consuming, and expensive. If not completely removed, persistent flux residue can compromise the solder joint integrity and potentially contaminate a surgical patient.

Plating is another technique used for soldering difficult-to-solder alloys. In the case of nickel-titanium, nickel plating can be used. Nitinol can be nickel plated with both electroless and electrolytic processes. Often the part is plated with a secondary layer of a more noble metal, such as gold over the nickel. Soldering can then be done on the plated surface using an appropriate flux. The major drawback to this approach is that plating titanium is an involved and difficult process. Nickel plating is typically a multi-step process involving cleaning, etching, and plating. Plating titanium alloys is even more complex due to their tenacious surface oxides. Often, several intermediate plating steps may be necessary to facilitate the final nickel plating. For most manufacturers, it is very costly to develop extensive in-house plating capabilities and the expertise just to facilitate a soldering process. Furthermore, plating quality can vary greatly and plating vendors are often reluctant to work with titanium alloys due to issues of handling and storing the aggressive chemicals involved such as hydrofluoric acid. An additional drawback is that even though fluxes that are less aggressive than the halogen based ones can be used to solder the plated surface, the flux residues must still be removed completely.

While the concept of ultrasonic soldering has been around for half a century, it has had very limited commercial success. It did show some potential for soldering aluminum heat exchangers, but this effort was largely dropped in favor of several competing approaches. While its use remains relatively limited, the most common commercial application appears to be in pre-tinning, or solder coating, of copper electrical leads and components. Limited success has been achieved in using ultrasonic soldering to solder difficult to solder materials. Although, it has been used in conjunction with indium-based solder alloys to aid slightly in the soldering of oxide ceramics, these joints can also be made easily without the use of ultrasonic soldering. Furthermore, joints made with indium-based alloys, with or without ultrasonic soldering, typically have very low strength, on the order of only several hundred pounds per square inch. Prior attempts to ultrasonically solder titanium and its alloys, using conventional as well as custom solder alloys have shown very limited success producing weak joints that result from a primarily mechanical bond instead of a true chemical bond.

In order to overcome the various problems encountered with prior art methods of joining hard-to-wet materials, it is an object of the present invention to provide a soldering method and solder alloy for wetting and joining these hard-to-join materials.

It is an object of the present invention to join hard-to-join materials at a low temperature.

It is an object of the present invention to join hard-to-join materials without the need for corrosive fluxes.

It is an object of the present invention to avoid the production of hazardous workplace fumes and joining by-products It is an object of the present invention to avoid the production of environmentally dangerous fumes and joining by-products.

It is an object of the present invention to join hard-to-join materials without the need for tedious and complex plating steps.

It is an object of the present invention to join hard-to-join materials without the need for use of corrosive plating chemicals.

It is an object of the present invention to join hard-to-join materials using a minimum of processing steps.

It is an object of the present invention to join nitinol parts without loss of superelasticity or shape memory characteristics.

It is an object of the present invention to clean hard-to-join materials without the use of a flux.

It is an object of the present invention to provide high-strength joints for hard-to-join materials.

It is an object of the present invention to join hard-to-join materials using inexpensive equipment.

It is an object of the present invention to join hard-to-join materials with little if any joint cleanup after the joining process.

It is an object of the present invention to join hard-to-join materials with no flux residue cleaning after the joining process.

It is an object of the present invention to join hard-to-join materials without the use of a vacuum, or reducing gas environment.

It is an object of the present invention to form solder wetted areas on hard-to-wet materials.

It is an object of the present invention to provide a tin-based alloy solder with an active wetting promoting chemical element.

It is an object of the present invention to use aluminum as an active wetting promoting element in a tin alloy.

The foregoing and other objects, features and advantages of the invention will become apparent from the following disclosure in which one or more preferred embodiments of the invention are described in detail. It is contemplated that variations in procedures may appear to a person skilled in the art without departing from the scope of or sacrificing any of the advantages of the invention.

SUMMARY

To meet these objects a novel and useful solder alloy has been developed. The soldering alloy consists essentially of a tin base and an active wetting promoting element such as aluminum in the presence of ultrasonic energy. Typically aluminum may be used in amounts ranging from 0.1 to 20 wt % with 2–3 wt % being readily prepared by dissolving aluminum in molten tin until saturation occurs. The tin-aluminum alloy has been found to readily wet a wide variety of materials with tenacious surface oxides that previously have been wettable only through the use of highly corrosive flux materials. The feature of using a fluxless soldering alloy has the advantage of eliminating hazardous soldering plumes formed during the soldering process and also eliminating the corrosive flux residue left after the soldering operation is complete. Other elements such as silicon, magnesium, calcium, titanium, hafnium, zirconium, and zinc may be used in place of or in addition to aluminum.

This solder alloy has been found to easily wet a wide variety of previously hard to wet materials including, but not limited to, nickel-titanium alloys such as nitinol, aluminum and aluminum alloys, stainless steels, carbon steels, glasses, ceramics including oxide and carbide ceramics, copper and copper alloys, nickel and nickel alloys including nickel-iron alloys. Once wetted, a wide variety of joints are easily obtainable including nitinol to nitinol, glass to glass, ceramic to ceramic, glass to metal, metal to metal, alloy to alloy, glass to alloy, ceramic to glass, among others.

The wetting capabilities of the soldering alloy is particularly effective when used In the presence of ultrasound to wet hard-to-wet work pieces such as those with a tenacious surface oxide or other hard to remove surface layer. The solder alloy of the present invention is heated to a molten state and contracted with an area of the hard-to-wet work piece and ultrasound is applied to produce a solder wetted joint area on the work piece. Such a wetted material is useful in itself as a protective coating or as readily adhered base surface capable of receiving other coatings. The wetting process may be carried out in an inert atmosphere to prevent undue oxidation of the molten solder and the work piece as it is removed from the soldering environment. The solder alloy of the present invention may be applied with soldering irons and soldering pots, especially those equipped for use with ultrasound.

In typical joining applications of hard-to-wet materials such as those with a tenacious surface oxide, an area of each part to be joined is placed in close proximity or in contact with each other and the areas to be joined are heated to produce a molten tin-alloy solder. The molten tin-alloy solder is contacted with at least one of the parts to be joined in the area of joining and ultrasonic energy is applied to the molten tin-aluminum solder in contact with the part to be joined until the area of each part to be joined is wetted with the molten tin-alloy solder. Once the parts to be joined are wetted with the solder in the area of the joint, i.e., the bond region, the parts to be joined are allowed to cool to form a soldered joint in the bond region between the parts to be joined.

Alternatively, the joining method may be practiced by heating one of the parts to be joined in the area of joining to the meting point of the tin-alloy solder. Molten tin-alloy solder on a heated soldering iron is then contacted with the part in said area of joining and ultrasonic energy applied until the area of said part to be joined is wetted with said molten tin-alloy solder. The process is repeated in a similar fashion for a second part. After both parts are wetted with the tin-alloy solder, the two parts are placed together and reheated to allow the tin-alloy solder from each part to flow together after which the parts are cooled to form a joint between the first and second parts.

In a third embodiment, areas of the parts to be joined are secured in proximity with each other, that is, dose to or in contact with each other, and the areas immersed in molten tin-alloy solder to which ultrasonic energy is applied until the area of each part to be joined is wetted with molten tin-active element alloy solder. The parts are then withdrawn from said molten solder and allowed to cool to form a solid joint in the bond region between the parts.

In yet a fourth embodiment, areas of the parts to be joined (in the area of the joint) are immersed in molten tin-active wetting promoting chemical element alloy solder and ultrasonic energy applied to the molten tin-alloy solder until the joint areas of each part are wetted with the molten tin-alloy solder. The parts are withdrawn from the molten solder and the wetted areas of the parts placed in contact with each other and the tin-alloy solder flowed together with additional heat after which the parts are allowed to cool to form the desired joint.

It is to be realized the both work pieces to be joined do not have to be hard-to-wet materials. The solder will also wet conventional materials and allow their joining to hard to wet materials. When the work pieces are first wetted and allowed to cool followed by bond region positioning of the respective areas of the work pieces, additional solder alloy may be applied to the bond region as it is heated to produce the desired joint. Additional ultrasonic energy may also be used during the reheating process. It is also possible to apply and use conventional solders during the reheat process.

The foregoing and other objects, features and advantages of the invention will become apparent from the following disclosure in which one or more preferred embodiments of the invention are described in detail and illustrated in the accompanying drawings. It is contemplated that equivalent variations in procedures, alloy and soldered material compositions and arrangement of parts may appear to a person skilled in the art without departing from the scope of or sacrificing any of the advantages of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although preferred embodiments of the invention have been herein described, it is understood that various changes and modifications in the illustrated and described structure and compositions can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 1:
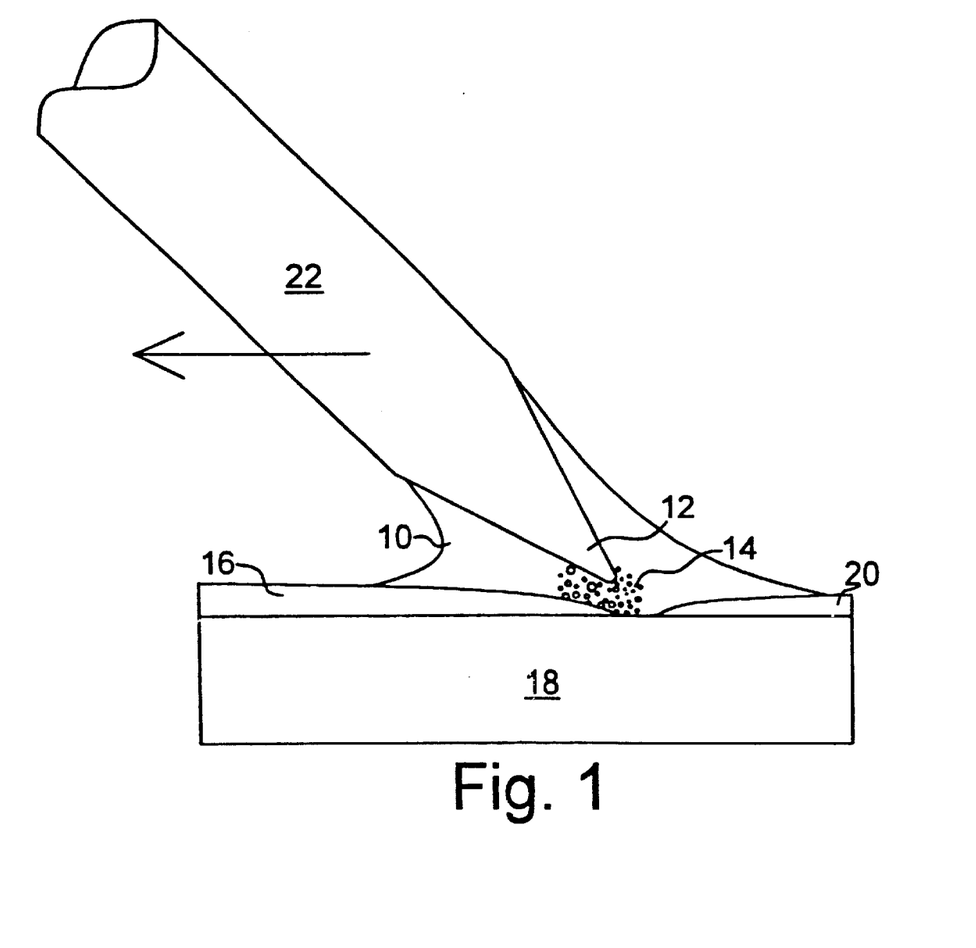
FIG. 1 is a plan view of ultrasonic soldering illustrating the use of the solder alloy of the present invention with ultrasonic cavitation to break up and disperse the base metal surface impurities and solder wetting.

As shown in FIG. 1, ultrasonic soldering is based on the same principles as ultrasonic cleaning. A high-frequency vibration (typically 20 kHz or more) is introduced into the liquid solder 10 by means of the tip 12 of soldering iron 22. This vibrational energy induces cavitation 14 in the solder and, subsequently, a strong erosion effect on any solid surface 16 in proximity to the cavitation. The cavitation breaks up and disperses the base metal surface impurities 16, allowing the solder to wet and bond 20 to the base material 18.

Figure 2:
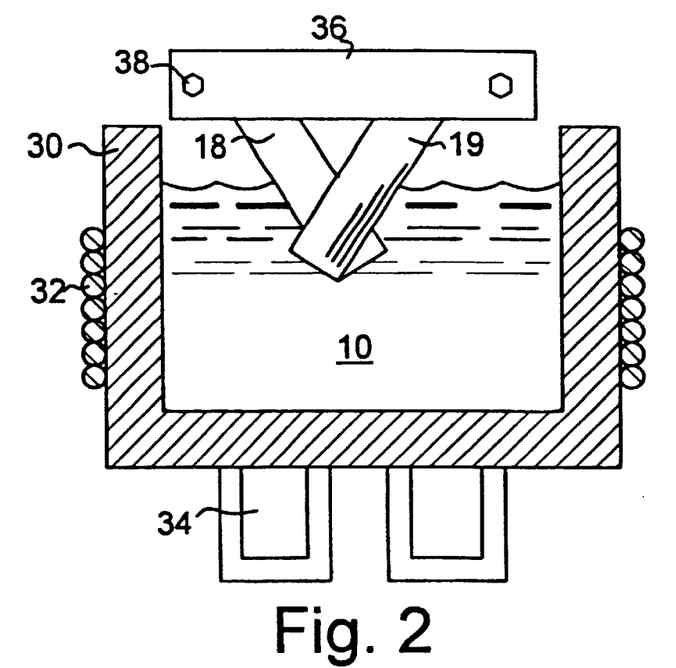
FIG. 2 is a cross-sectional side of an ultrasonic solder pot filled with the molten solder of the present invention and illustrating the external placement of ultrasound transducers and the single dip method of producing a soldered joint between two work pieces.
Figure 3:
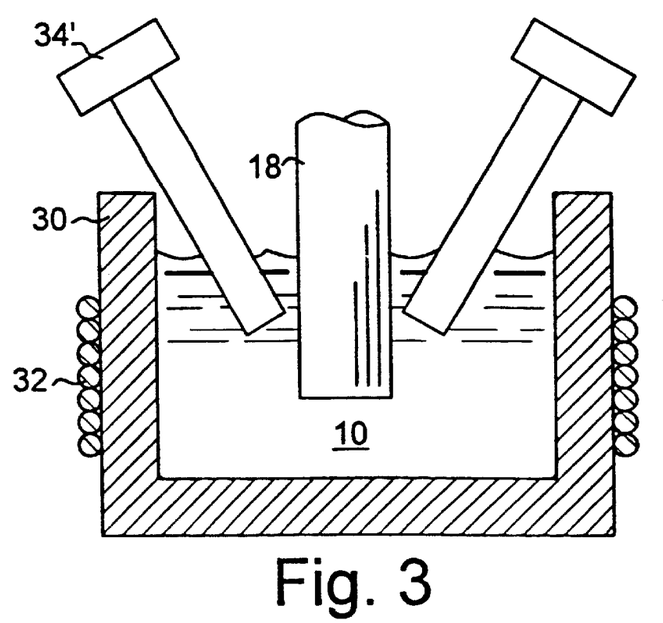
FIG. 3 is a cross-sectional view of an ultrasonic solder pot filled with the molten solder alloy of the present invention and illustrating the immersion of the ultrasonic transducers in the solder itself and the use of the solder pot to produce a wetted work piece.

Another device for ultrasonic soldering is the ultrasonic solder pot. There are a number of solder pot designs and configurations of which two are shown in FIGS. 2 and 3. All solder pots 30 have three main design elements, a solder pot or container 30, heaters 32, and ultrasonic transducers hat either contact the pot 34 (FIG. 2) or the solder directly 34' (FIG. 3). Once the solder 10 is at the desired soldering temperature, the parts 18, 19 are immersed and the solder 10 is ultrasonically energized with the transducers 34, 34'. The energizing cycle times can be relatively short with 1 to 5 seconds being typical.

Another variation of ultrasonic soldering uses an ultrasonic soldering iron 22 such as shown in FIG. 1. It functions much like a conventional soldering iron, except that the soldering tip 12 can be ultrasonically energized. Compared to the solder pot 30 described above, ultrasonic soldering irons 22 are inexpensive and are useful for low-volume production and offer a great degree of flexibility on complex joint configurations.

Using a soldering iron 22 such as shown in FIG. 1, solder joints on Nitinol were easily made by ultrasonically soldering. Two methods can be used, direct soldering of the assembled joint, or wetting (pre-tinning) and reflow soldering. For both methods, the first step is to wet the soldering iron tip 12 with solder alloy 10. To do this, liquid solder alloy 10 is melted on the tip 12 of the soldering iron 22 with the tip heated and the ultrasonic energy activated. After several seconds, the solder 10 wets the tip 12 of the soldering iron 22 allowing the ultrasound to fully couple with the liquid solder 10. Once the ultrasonic energy is coupled to the liquid solder 10, it generates cavitation 14 within the liquid solder 10.

In direct soldering, the parts (work pieces) are first assembled, i.e., held in proximity (either in contact or close together) in the desired configuration. The parts are then heated to the melting temperature of the solder alloy using either the soldering iron, or the iron along with some supplemental heat source such as a hot plate. Once the parts are at temperature, the soldering iron is placed in contact with the joint (if it is not already) and the ultrasonic energy is activated to transfer solder from the iron to the joint surfaces. The iron's tip itself may, but does not necessarily have to physically touch the parts. If necessary, additional solder, typically in the form of a solid wire, can be fed into the joint during the soldering operation. While still holding the parts together, the parts are allowed to cool to room temperature to solidify the solder.

In the wet and reflow method, prior to assembly the parts are first individually wetted, i.e., coated or pre-tinned, with solder using the same technique described above for direct soldering. Once coated, the parts are assembled, or held together, in the desired configuration. The parts are now reheated to the melting temperature of the solder alloy, allowing the solder alloy on each part to remelt, or re-flow together forming the final joint. Again, the parts are held together while cooling to room temperature to allow the solder to solidify.

As shown in FIGS. 2 and 3, an ultrasonic soldering pot 30 is used by immersing the parts, either assembled or separately, in the liquid solder 10. Once the parts are heated to the temperature of the solder 10, typically in a few seconds, the ultrasonic energy is applied for a few more seconds, typically less than about 5 seconds, and the parts are withdrawn to cool. In some cases, immersing the parts several times in quick succession produces better results than one continuous immersion. As with conventional solder pots, if the parts 18 are simply being wetted (pre-tinned) in the pot 30, they may be re-flowed together elsewhere with another heat source. For assembled parts and as shown in FIG. 2, the parts 18,19 can be held in the desired position with a clamp 36 and fastener 38 or other securing device when they are immersed and after they are removed from the liquid solder and allowed to cool.

The key process factors for good solder wetting of the base material 18 are the provision of adequate base metal preheat, adequate ultrasonic power, and in the case of using a soldering iron 22, proper wetting of the tip 12 by the solder 10. Adequate base metal preheat is necessary to ensure that the liquid solder 10 on the tip 12 of the iron 22 remains fully molten when it is brought in contact with the base material 18. If the base material 18 is at too low a temperature, the liquid solder 10 may solidify or a thin layer adjacent to the base metal surface may solidify. If the solder 10 solidifies, it will prevent the generation of cavitation 14 outright or if a layer of solidified solder forms on the base metal surface, it will form a barrier preventing the cavitation from removing the base metal surface impurities. When using a soldering iron 22, the necessary preheat temperature is typically within about 50° C. of the melting point of the solder alloy. This is somewhat dependent however on the size and temperature of the soldering iron tip 12, the size and composition of the base material 18, and the composition of the soldering alloy. When using an ultrasonic soldering pot 30, preheating is achieved by simply immersing the parts 18,19 in the liquid solder bath 10 and allowing the parts 18,19 to heat to the temperature of the bath.

Adequate ultrasonic power is necessary to generate enough cavitation to remove the surface oxide and other impurity layers on the base material 18. The more tenacious the oxide the more cavitation is needed to remove it. To solder Ni—Ti, the maximum ultrasonic power available is typically necessary for both a soldering iron 22 and a pot 30.

When using a soldering iron 22, inadequate wetting of the iron's tip 12 results in poor sonic coupling, which prevents wetting of the base material 18. The liquid solder 10 must be wet to the tip 12 of the soldering iron 22, using the technique described above, to insure adequate coupling of the ultrasonic energy. Cavitation 14 is generated in the solder only as a result of the ultrasonic energy traveling through it. The ultrasound is not transferred from the iron's tip 12 to the solder 10 unless it wets, or is in intimate contact with, the iron's tip 12.

Contrary to prior art teachings, a novel tin-aluminum alloy has been found to wet Nitinol and many other hard-to-wet materials much better than pure tin (Sn), tin alloy solders such as tin-indium (Sn—In), or other common solder alloys such as lead-tin (Pb—Sn). Although initially a pure tin solder was believed to wet Nitinol, subsequent experiments have shown that it is virtually impossible to wet Nitinol using only pure tin. The Nitinol results achieved from what appeared to be pure tin were later found to be due to impurities introduced into the pure tin solder during soldering iron wetting.

The novel solder alloy is made by adding a small amount of aluminum to essentially pure tin. Without wishing to be bound by any one theory of operation, it appears that the aluminum (Al) acts as an active element in the solder, and when used in conjunction with ultrasonic energy results in greatly enhanced wetting. I appears that localized heating adjacent to the soldering iron, which is generated by the ultrasonically induced cavitation in the solder, drives a chemical reaction between the aluminum (the active wetting promoting element) in the solder and the Nitinol. This reaction between the aluminum and the Nitinol generates a reaction layer on the surface of the Nitinol. The formation of this reaction layer greatly enhances the wetting of the solder and provides the bond between the solder and the Nitinol. The amount of aluminum needed in the solder can vary from 0.1 to 20 wt. % with 1–5 wt. % preferred and 2–3 wt % most preferred. Other active elements can be added in conjunction with, or as a substitute for aluminum (Al), including: silicon (Si), magnesium (Mg), calcium (Ca), titanium (Ti) hafnium (Hf), zirconium (Zr) and zinc (Zn).

One convenient method of making the solder alloy is by heating and melting tin and subsequently dissolving solid pieces of pure aluminum into the molten tin. For example, molten tin held at 250° C. will dissolve aluminum up to the liquid solubility level of about 2–3 wt. %. The alloy can also be made using conventional furnace or arc melting methods. Upon solidification, the tin-aluminum (Sn—Al) solder alloy becomes a two-phase alloy consisting of βSn matrix with a small mount of pure Al phase.

Typical joints were made with the Sn-based Al solder alloy, a preheat of about 250° C. and 35 watts of ultrasonic power. Following standard practice, the two work piece strips 18, 19 were wetted (pre-tinned) and then reflowed together to insure complete solder coverage over the entire surface of the joint. Wetting times were typically several seconds for each part. The wetted parts were then put together to form a lap joint and reheated to re-flow the solder. Only light pressure was used to hold the parts together during re-flow. Although not necessary, additional ultrasonic energy was used during the re-flow. No additional solder was added to the joint. No additional cleaning was required after soldering.

To control bead profile and appearance, the amount of residual oxide should be reduced as much as possible. This can be done by mechanically removing any excess oxide formed during wetting (pre-tinning), limiting the time at temperature during re-flow, and using a gas shield during both wetting (pre-tinning) and re-flow. Any suitable inert gas such as nitrogen or Ar is effective at shielding the liquid solder from air. As used here, the term "inert gas" is any gas that does not react with either the work piece (part) to be joined or the solder to adversely effect the soldered joint.

Figure 4:
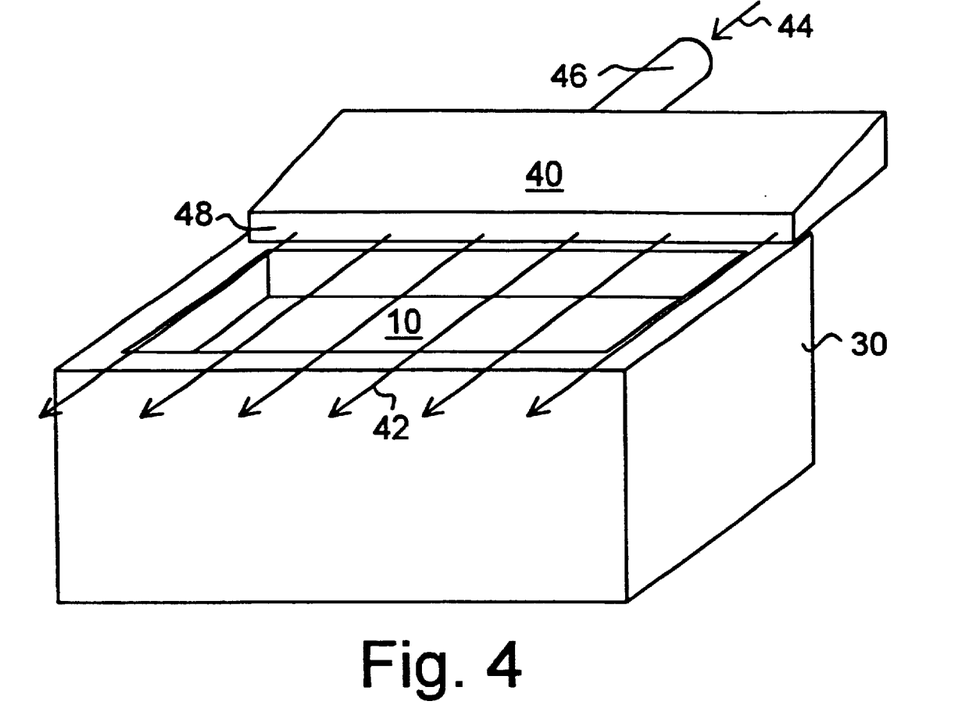
FIG. 4 is a perspective view of an "inert gas knife" used to shield the liquid solder alloy in the solder pot and to minimize the oxide that forms on parts wetting or joined in the pot.

A solder pot 30 similar to that shown in FIG. 2 was also used for joining hard-to-join materials such aluminum, steels including stainless steel, and Nitinol. Nitinol was successfully wetted (pre-tinned) by dipping the parts into the pot with the ultrasonic power activated. Pre-tinning with a solder pot 30 produces a cleaner (less oxidized) pre-tinned coating. In addition and as shown in FIG. 4, most pots 30 can be easily fitted with an inert gas "knife" 40 that cleans the parts as they are removed from the solder bath 30 and further minimizes surface oxidation. As shown, a gas "knife" 40 provides a flow, or blanket, of inert gas 42 across the top of the solder pot. This blanket of inert gas 42 minimizes excessive oxidation on the surface of the liquid solder in the pot as well as on parts as they are removed from the pot. Basically the gas knife has a slit 48 formed in the gas knife 40 that spreads the inert gas 44 from inlet 46 over the surface of the solder pot 30.

Figure 5:
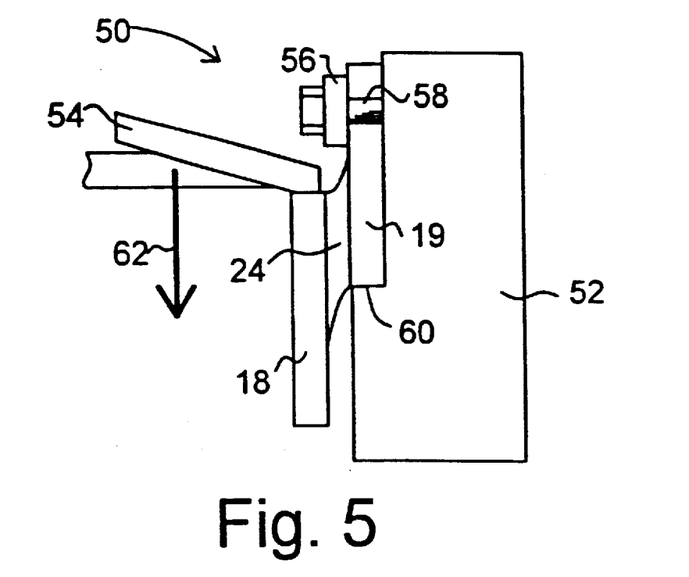
FIG. 5 is a side elevation view of a shear test setup for testing the shear strength of joints using the solder alloy and soldering method of this invention.

Shear strength tests were performed on joints made with halogen flux and the ultrasonic soldering iron 22. Both Nitinol-Nitinol and Nitinol-stainless steel joints were tested. Test samples were made with Nitinol strip material 0.016× 0.202 in (0.41×5.13 mm) and 316 stainless strip 0.025× 0.202 in (0.64×5.13 mm). As is standard practice all joint surfaces were pre-cleaned, using a silicon carbide microblaster followed by wiping with methanol. The fluxed joints were soldered using Indalloy Flux #3. A conventional soldering iron was used at about 285° C. for the fluxed joints. The ultrasonic iron was used at about 350° C. and 35 watts of power. For both processes, pieces were pretinned (wetted) and then re-flow soldered together to form the test samples. Shear tests were performed using a Quad Group, Sebastian Five, microforce materials tester 50 shown in basic form in FIG. 5. As shown, an edge of one of the work pieces 19 is placed on the ledge 60 of the test block 52 and held in place with a clamping piece 56 secured to the test block by a suitable fastener such as bolt 58. A loading head 54 is used to apply a load 62 to the end of the second work piece of the joint 24.

The results of the testing are shown in Table 1. The shear strengths of the ultrasonic joints, made with the tin-aluminum solder alloy, appear to be as good, or better, than those for the fluxed joints. Published values for tin solder joints on copper (Cu—Cu) are included for comparison. Shear test results for solders vary depending on the specific soldering and testing conditions. Solder compositions are given in wt. percent. The shear strengths in psi ($N/m^2 \times 10^7$) were determined at room temperature and are an average of five tests. The loading rate was 0.4 kg/sec and the average speeds were 0.013 to 0.023 in/min (0.33 to 0.58 mm). The test speed for the Cu—Cu samples are given in the comments column.

TABLE 1

Shear Strength Test Results

| Joint Materials | Solder/Process | Shear Strength | Comments |
| --- | --- | --- | --- |
| Nitinol - Nitinol | Sn + Al/Ultrasonic | 6355 (4.382) | |
| Nitinol - Stainless | Sn + Al/Ultrasonic | 4989 (3.440) | |
| Nitinol - Nitinol | 100% Sn/Flux | 6446 (4.444) | Indalloy Flux #3 |
| Nitinol - Stainless | 100% Sn/Flux | 2634 (1.816) | Indalloy Flux #3 |
| Nitinol - Stainless | 96.5 Sn 3.5 Ag/Flux | 3683 (2.539) | Indalloy Flux #3 |
| Cu—Cu | 100% Sn | 3800 (2.620) | |
| Cu—Cu | 96.5 Sn 3.5 Ag | 4190 (2.889) | 0.008 in/min (0.2 mm/min) |
| | | 5470 (3.771) | 0.040 in/min (1.0 mm/min) |

In addition to allowing the direct (in air), fluxless soldering of Nitinol, this solder alloy has also been used to directly wet solder to many other metals and ceramics including many difficult-to-wet materials such as stainless steels, aluminum alloys, carbon steels, glasses, oxide ceramics, and carbide ceramics. Furthermore, this solder has been used to make joints between ceramic and metals and ceramics and ceramics. Examples include: Cu to glass or alumina. Al to glass or alumina, Ni to glass or alumina, stainless steel to glass or alumina, and Kovar (a low expansion Fe-based alloy) to glass or alumina.

The following examples further illustrate the method of carrying out and practicing the invention.

EXAMPLE I

Ultrasonic Solder Iron Joining of Nitinol Parts using Tin-Aluminum Solder

Strips of Nitinol 0.016 in (0.405 mm) thick, 0.202 in (0.513 cm) wide, and 0.750 in (1.91 cm) long were used. The ultrasonic soldering iron used was Model No. G-35/T-35 made by Fibra Sonics, Inc. of Chicago Ill. Any heavy surface oxides, scale, or other surface contaminants were removed by first microblasting (single tank micro-abrasive blaster and Clearview chamber made by Comco of Burbank Calif.) with 50 micron SiC and washing with methanol. Initially a strip was placed on a hotplate that was set to 240° C. and heated to this temperature. A small quantity of the Sn—Al solder alloy was heated in an aluminum oxide dish, to melting, on the hotplate as well. The ultrasonic soldering iron was turned on to the low heat setting (16 watts) and the Up heated to approximately 500° C. After the Nitinol strip and the soldering iron were at temperature, the Up of the ultrasonic soldering iron was coated, or wet, with the Sn-2 wt. % Al solder by placing the tip in the melted pool of solder and the ultrasonic energy (35 watts, 30 kHz) activated for approximately 3 to 5 seconds. After being coated with solder, the tip was placed in contact with the heated Nitinol strip and the ultrasonic energy reactivated. The solder on the tip immediately begins to transfer to the Nitinol strip, pre-tinning the strip. The tip is moved over the surface of the Nitinol and solder is transferred everywhere the tip comes in contact. The transfer of solder continues until all the available solder is removed from the tip. If more solder is needed the tip can be re-coated in the molten pool of solder as many times as is necessary to coat the required area of the strip. Once the strip was pre-tinned it was removed from hotplate and allowed to cool to room temperature. This pre-tinning procedure was repeated on the mating strip of Nitinol. Once both strips were pre-tinned, they were assembled into a typical lap joint with the pre-tinned surfaces in contact and an overlap of approximately ⅓ the length of one of the strips. The strips were then placed back on the hotplate in the lap joint configuration and held together by pressing down on the joint lightly with a pair of pliers or similar tool. The strips were reheated until the solder remelted, or re-flowed, and the two pre-tinned surfaces melted together. The joint was then moved from the center to the outer edge of the hotplate where the temperature was below the melting temperature of the solder (approximately 230° C.) and the joint was allowed to solidify before removing it from the hotplate and allowed to cool to room temperature.

A shear test was then performed using a Sebastian Five, precision force materials tester, equipped with the S Module, made by Quad Group of Spokane, Wash. The shear strength was found to be 6355 psi (447 kg/cm) (average of five tests at room temperature).

EXAMPLE II

Ultrasonic Solder Iron Joining of Nitinol to Stainless Steel Parts using Tin-Aluminum Solder The same process according to Example I was used except one part was Stainless Steel(same dimensions as the Nitinol strip). The shear strength of this joint was found to be 4989 ksi (351 kg/cm$^2$)(average of 5 tests at room temperature).

EXAMPLE III

Ultrasonic Solder Pot Joining of Nitinol Parts using Tin-Aluminum Solder

Strips of Nitinol 0.016 in (0.405 mm) thick, 0.202 in (0.513 cm) wide, and 0.750 in (1.91 cm) long were used. The ultrasonic soldering pot used was Model No. TP-6B-2 made by Blackstone Ultrasonics of Jamestown N.Y. Any heavy surface oxides, scale, or other surface contaminants were removed by first microblasting (single tank micro-abrasive blaster and Clearview chamber made by Comco of Burbank Calif.) with 50 micron SiC and washing with methanol. The solder pot was preheated to approximately 250° C. to melt the Sn-2 wt %Al solder. The ultrasonic energy was turned on (45 kHz, 100% power setting) for several minutes prior to soldering to insure good wetting of the liquid solder to the walls of the solder pot. One end of each of the Nitinol strips (approximately 0.5 inches (1.27 cm)) was immersed in the liquid solder for about 5 seconds, removed and then immediately re-immersed for an additional 2 to 3 seconds. The strips were finally removed and allowed to cool to room temperature. The strips were then held together with a pair of pliers with the pre-tinned ends overlapping to form a lap joint While holding the joint together with the pliers it was immersed into the solder pot with the ultrasonic energy on. The joint was held in the pot for several seconds and then removed and allowed to cool. A sound solder joint was formed between the Nitinol strips similar to that formed in Examples I and II.

EXAMPLE IV

Ultrasonic Solder Iron Joining of Aluminum Parts using Tin-Aluminum Solder

The same process according to Example I was used except Aluminum parts were used. The aluminum was easily wet and a sound solder joint was formed similar to that in Examples I and II.

EXAMPLE V

Ultrasonic Solder Iron Joining of Carbon Steel Parts using Tin-Aluminum Solder

The same process according to Example I was used except carbon steel parts were used. The carbon steel was easily wet and a sound solder joint was formed similar to that in Examples I and II.

EXAMPLE VI

Ultrasonic Solder Iron Joining of Copper Parts using Tin-Aluminum Solder

The same process according to Example I was used except copper parts were used. The copper was easily wet and a sound solder joint was formed similar to that in Example I.

EXAMPLE VII

Ultrasonic Solder Iron Joining of Nickel Parts using Tin-Aluminum Solder

The same process according to Example I was used except nickel parts were used. The nickel was easily wet and a sound solder joint was formed similar to that in Example I.

EXAMPLE VIII

Ultrasonic Solder Iron Joining of Glass Parts using Tin-Aluminum Solder

The same process according to Example I was used except glass (borosilicate and soda lime) parts were used. The glass was easily wet and a sound solder joint was formed similar to that in Example I.

EXAMPLE IX

Ultrasonic Solder Iron Joining of Aluminum Oxide (Alumina) Parts using Tin-Aluminum Solder The same process according to Example I was used except alumina parts were used. The alumina was easily wet and a sound solder joint was formed similar to that in Example I.

EXAMPLE X

Ultrasonic Solder Iron Joining of Copper to Glass Parts using Tin-Aluminum Solder The same process according to Example I was used except copper parts were joined to glass parts. Both the copper and glass were easily wet and a sound solder joint was formed between them similar to that in Example I.

EXAMPLE XI

Ultrasonic Solder Iron Joining of Copper to Alumina Parts using Tin-Aluminum Solder The same process according to Example I was used except copper parts were joined to alumina parts. Both the copper and alumina were easily wet and a sound solder joint was formed between them similar to that in Example I.

EXAMPLE XII

Ultrasonic Solder Iron Joining of Nickel to Glass Parts using Tin-Aluminum Solder The same process according to Example I was used except nickel parts were joined to glass parts. Both the nickel and glass were easily wet and a sound solder joint was formed between them similar to that in Example I.

EXAMPLE XIII

Ultrasonic Solder Iron Joining of Nickel to Alumina Parts using Tin-Aluminum Solder The same process according to Example I was used except nickel parts were joined to alumina parts. Both the nickel and alumina were easily wet and a sound solder joint was formed between them similar to that in Example I.

EXAMPLE XIV

Ultrasonic Solder Iron Joining of Kovar to Glass Parts using Tin-Aluminum Solder The same process according to Example I was used except Kovar (low thermal expansion Fe—Ni alloy) parts were joined to glass parts. Both the Kovar and glass were easily wet and a sound solder joint was formed between them similar to that in Example I.

EXAMPLE XV

Ultrasonic Solder Iron Joining of Kovar to Alumina Parts using Tin-Aluminum Solder The same process according to Example I was used except Kovar parts were joined to alumina parts. Both the Kovar and alumina were easily wet and a sound solder joint was formed between them similar to that in Example I.

It is possible that changes in configurations to other than those shown could be used but that which is shown if preferred and typical. Without departing from the spirit of this invention, various means of fastening or holding the work pieces together during the soldering and cooling steps may be used. The soldering alloy of the present invention may suitably comprise, consist of, or consist essentially of the elements tin and aluminum or other active wetting promoting chemical elements. The invention illustratively disclosed herein suitably may be practiced in the absence of any element which is not specifically disclosed herein.

It is therefore understood that although the present invention has been specifically disclosed with the preferred embodiment and examples, modifications to the design concerning soldering steps and solder alloy composition will be apparent to those skilled in the art and such modifications and variations are considered to be equivalent to and within the scope of the disclosed invention and the appended claims.

I claim:

1. A method for producing a solder wetted area on a hard-to-wet work piece comprising the steps of:
   a) heating sufficiently a soldering alloy consisting essentially of tin and an active wetting promoting element selected from the group of active wetting promoting elements consisting of aluminum, calcium, magnesium, silicon, and mixtures thereof to produce a molten solder alloy;
   b) contacting an area of said hard-to-wet work piece with said molten solder alloy; and
   c) applying sufficient ultrasonic energy to said molten solder alloy while contacting said area to produce a solder wetted joint area on said work piece.

2. The method for producing a solder wetted area on a hard-to-wet work piece according to claim 1 wherein said active wetting promoting element is aluminum.

3. The method for producing a solder wetted area on a hard-to-wet work piece according to claim 2 with said solder alloy consisting essentially of about 80 to about 99.9 weight percent tin and about 0.1 to about 20 weight percent aluminum as said active wetting promoting element.

4. The method for producing a solder wetted area on a hard-to-wet work piece according to claim 3 with said solder alloy consisting essentially of about 97 to about 98 weight percent tin and about 2 to about 3 weight percent aluminum as said active wetting promoting element.

5. The method for producing a solder wetted area on a hard-to-wet work piece according to claim 1 wherein said hard-to-wet work piece is a work piece selected from the group of hard-to-wet work pieces consisting of nickel-titanium alloy, aluminum alloy, stainless steel, carbon steel, glass, ceramic, copper and copper alloy work pieces.

6. The method for producing a solder wetted area on a hard-to-wet work piece according to claim 5 wherein said hard-to-wet work piece is a nickel-titanium alloy work piece.

7. The method for producing a solder wetted area on a hard-to-wet work piece according to claim 1 wherein at least one of said steps a), b) and c) is carried out in an inert atmosphere.

8. The method for producing a solder wetted area on a hard-to-wet work piece according to claim 1 wherein at least one of said steps a), b) and c) is carried out with a soldering iron.

9. The method for producing a solder wetted area on a hard-to-wet work piece according to claim 1 wherein at least one of said steps a), b) and c) is carried out with a soldering pot.

10. A manufacture formed according to claim 1.

11. A soldering method for joining at least two work pieces comprising:
   a) placing at least a portion of said solder wetted area formed on said hard-to-wet work piece according to claim 1 in proximity with an area to be joined on a second work piece to form a bond region;
   b) heating said bond region sufficiently to melt said soldering alloy of said solder wetted area; and
   c) cooling said work piece and said second work piece to form a soldered joint in said bond region.

12. The soldering method for joining at least two work pieces according to claim 11 further comprising the steps of adding and melting additional solder in said bond region prior to said cooling step.

13. The soldering method for joining at least two work pieces according to claim 12 wherein said additional solder is said soldering alloy.

14. The soldering method for joining at least two work pieces according to claim 13 further comprising the step of applying ultrasonic energy to said additional solder while in a molten state.

15. The soldering method for joining at least two work pieces according to claim 11 wherein at least one of said steps of joining said work pieces is conducted in an inert atmosphere.

16. A manufacturer formed according to the method of claim 11.

17. A soldering method for joining at least two work pieces comprising:
   a) placing an area to be joined on a second work piece in proximity with said area of said hard-to-wet work piece prior to said contacting step b) of claim 1 to form a bond region; and
   b) after said applying of said sufficient ultrasonic energy step, cooling said hard-to-wet work piece and said second work piece while maintaining said bond region to form a joint between said hard-to-wet work piece and said second work piece.

18. The soldering method for joining at least two work pieces according to claim 17 wherein said hard-to-wet work piece is a work piece selected from the group of hard-to-wet work pieces consisting of nickel-titanium alloy, aluminum, aluminum alloy, stainless steel, carbon steel, glass, ceramic, copper and copper alloy work pieces.

19. The soldering method for joining at least two work pieces according to claim 18 wherein said hard-to-wet work piece is a nickel-titanium alloy work piece.

20. A manufacture formed according to the method of claim 17.

21. A method for producing a solder wetter area on a hard-to-wet work piece comprising the steps of:
   a) heating sufficiently a soldering alloy consisting essentially of about 97 to about 98 weight percent tin and about 2 to about 3 weight percent aluminum as an active wetting promoting element to produce a molten solder alloy;
   b) contacting an area of said hard-to-wet work piece with said molten solder alloy; and
   c) applying sufficient ultrasonic energy to said molten solder alloy while contacting said area to produce a solder wetted joint area on said work piece.

22. A method for producing a solder wetted area on a hard-to-wet nickel-titanium alloy work piece comprising the steps of:
   a) heating sufficiently a soldering alloy consisting essentially of tin and an active wetting promoting element selected from the group of active wetting promoting elements consisting of aluminum, calcium, magnesium, silicon, and mixtures thereof to produce a molten solder alloy;

b) contacting an area of said nickel-titanium alloy hard-to-wet work piece with said molten solder alloy; and c) applying sufficient ultrasonic energy to said molten solder alloy while contacting said area to produce a solder wetted joint area on said work piece.

23. A soldering method for joining at least two work pieces comprising:

a) placing an area to be joined on a second work piece in proximity with said area of a nickel-titanium alloy hard-to-wet work piece prior to said contacting step b) of claim 22 to form a bond region; and b) after said applying of said sufficient ultrasonic energy step, cooling said nickel-titanium alloy hard-to-wet work piece and said second work piece while maintaining said bond region to form a joint between said hard-to-wet work piece and said second work piece.

* * * * *